(12) United States Patent
Grohmann

(10) Patent No.: US 9,964,423 B2
(45) Date of Patent: May 8, 2018

(54) DEVICE AND METHOD FOR DETERMINING THE MASS-FLOW OF A FLUID

(71) Applicant: Steffen Grohmann, Weingarten (DE)

(72) Inventor: Steffen Grohmann, Weingarten (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 792 days.

(21) Appl. No.: 14/364,681

(22) PCT Filed: Dec. 7, 2012

(86) PCT No.: PCT/EP2012/005051
§ 371 (c)(1),
(2) Date: Jun. 12, 2014

(87) PCT Pub. No.: WO2013/087174
PCT Pub. Date: Jun. 20, 2013

(65) Prior Publication Data
US 2015/0006092 A1 Jan. 1, 2015

(30) Foreign Application Priority Data

Dec. 12, 2011 (DE) .................. 10 2011 120 899

(51) Int. Cl.
*G01F 1/684* (2006.01)
*G01F 1/696* (2006.01)
(Continued)

(52) U.S. Cl.
CPC ............ *G01F 1/6842* (2013.01); *G01F 1/684* (2013.01); *G01F 1/6847* (2013.01);
(Continued)

(58) Field of Classification Search
CPC ........ G01F 1/74; G01F 1/8436; G01F 1/6847; G01F 15/024; G01F 25/0007; G01F 1/6965; G01N 2030/324
(Continued)

(56) References Cited

U.S. PATENT DOCUMENTS 4,478,277 A * 10/1984 Friedman ................ F28F 3/025
165/170
4,517,838 A 5/1985 Wachi et al.
(Continued)

FOREIGN PATENT DOCUMENTS

DE 4324040 A1 1/1994
EP 0137687 A1 4/1985
(Continued)

OTHER PUBLICATIONS

J.H. Huijsing, "Thermal mass-flow meter", J. Phys. E: Sci. Instrum. 21, Apr. 20, 1988, pp. 994-997.

*Primary Examiner* — Roy Y Yi
*Assistant Examiner* — Jeffrey Aiello
(74) *Attorney, Agent, or Firm* — Leydig, Voit & Mayer, Ltd.

(57) ABSTRACT

A device for determining the mass flow of a fluid includes a line for conducting the fluid in a flow direction to a contact with a heat exchanger. The heat exchanger has a surface temperature which is constant in the flow direction. The device also includes a first temperature measuring position upstream from the exchanger for determining a first fluid temperature, a second temperature measuring position downstream from the heat exchanger for determining a second fluid temperature, and a third temperature measuring position for detecting the surface temperature of the heat exchanger.

16 Claims, 7 Drawing Sheets

(51) Int. Cl.
*G01F 1/688* (2006.01)
*G01F 1/699* (2006.01)
(52) U.S. Cl.
CPC ............ *G01F 1/6888* (2013.01); *G01F 1/696* (2013.01); *G01F 1/699* (2013.01)
(58) Field of Classification Search
USPC ........... 73/204.11, 204.23; 702/45, 100, 130; 165/287
See application file for complete search history.

(56) References Cited

U.S. PATENT DOCUMENTS

| | | | |
|---|---|---|---|
| 4,817,427 | A | 4/1989 | Kitano et al. |
| 4,972,707 | A | 11/1990 | Nijdam |
| 5,347,861 | A | 9/1994 | Satoh |
| 5,373,737 | A | 12/1994 | Hwang |
| 7,197,953 | B2 | 4/2007 | Olin |
| 7,895,888 | B2 | 3/2011 | Hasebe |
| 2006/0162911 | A1* | 7/2006 | Oh .................... F28D 1/0333 165/153 |
| 2010/0308257 | A1* | 12/2010 | Lampe .................. A23L 3/375 252/71 |

FOREIGN PATENT DOCUMENTS

| | | | |
|---|---|---|---|
| EP | 0395126 | A1 | 10/1990 |
| WO | 0114839 | A1 | 3/2001 |
| WO | 2007063407 | A2 | 6/2007 |

\* cited by examiner

DEVICE AND METHOD FOR DETERMINING THE MASS-FLOW OF A FLUID

CROSS-REFERENCE TO RELATED APPLICATIONS

This application is a U.S. National Phase application under 35 U.S.C. § 371 of International Application No. PCT/EP2012/005051 (WO 2013/087174 A1), filed on Dec. 7, 2012, and claims benefit to German Patent Application No. DE 10 2011 120 899.6, filed Dec. 12, 2011.

FIELD

The present invention relates to determining the mass flow ṁ of a fluid, and particularly to determining the mass flow ṁ of a fluid for measuring and/or regulating mass flows of fluids in lines.

BACKGROUND

Thermal mass flow sensors or, synonymously, caloric mass flow sensors are based on the principle that heat is supplied to a flowing fluid. The heat transfer functions between the sensor and the fluid are thereby measured. The known 2-element principle has two elements which are arranged one behind the other in the flow direction and perform both the heating function and the function of temperature measurement. They are mounted on a heat-conducting line through which fluid flows, they are heated electrically and they are cooled by the flowing fluid. If both elements are heated with the same output, the line exhibits a symmetrical temperature profile around the elements when the fluid is at rest, that is to say the temperature difference between the elements is theoretically zero (see broken line in FIG. 1). When the fluid is flowing through the line, on the other hand, the temperature profile is displaced in the flow direction. A temperature difference ΔT of the elements which is proportional to the mass flow is thereby measured (see solid line in FIG. 1). In the case of the 3-element principle, the functions of heating and temperature measurement are separate. One or more heating elements are thereby arranged as centrally as possible between two temperature sensors located upstream and downstream. The measured temperature difference is again a measure of the mass flow.

In thermal mass flow sensors, the actual relationship between the mass flow and the measured temperature difference is complex. Determining factors are in particular the structural form (spacing of the sensors, size and shape of the heat exchange surfaces, axial and radial thermal resistivities, contact resistances), the flow conditions of the fluid, the fluid properties (viscosity, thermal conductivity, specific heat capacity), the installation position of the sensor and the ambient conditions. The functional relationship between the measured temperature difference and the mass flow is therefore determined empirically by multipoint calibration and stored in the form of sensor-specific characteristic curves. A large number of thermal mass flow sensors are known, in which the error sources of the measurement principle are limited or eliminated by different technical means.

U.S. Pat. No. 4,517,838 A, U.S. Pat. No. 5,347,861 A, U.S. Pat. No. 5,373,737 A, and EP 0 395 126 A1 describe sensors in which the measurement takes place, in a U-shaped bypass to the line in which the fluid is flowing. U.S. Pat. No. 4,517,838 A, U.S. Pat. No. 5,347,861 A and U.S. Pat. No. 5,373,737 A describe sensors according to the 2-element principle. In U.S. Pat. No. 4,517,838 A, the sensor pipe is surrounded by a narrow gap, as a result of which the effect of the installation position is reduced and the time constant is shortened. U.S. Pat. No. 5,347,861 A achieves the same aims by means of a heated thermal bridge over the sensor pipe. U.S. Pat. No. 5,373,737 A discloses an active cooling plate for eliminating the influence of the ambient temperature. In EP 0 395 126 A1, on the other hand, the 3-element principle is used. The start and end temperatures of the bypass are kept the same by strong thermal coupling; in order to compensate for the null drift, a two-part heating element is used. The measurement of the temperature difference takes place in such a manner that thermocouples or thermopiles connect the temperature measuring positions upstream and downstream of the heating element directly.

U.S. Pat. No. 7,895,888 B2 describes heater and temperature sensor chips which are secured to the surface of small pipelines and which operate according to the 3-element principle. In order to expand the measuring range, a plurality of temperature sensor pairs are arranged symmetrically to the central heater chip at different distances therefrom.

EP 0 137 687 A1, DE 43 24 040 A1, U.S. Pat. No. 7,197,953 B2 and WO 2007/063407 A2 describe sensors according to the 3-element principle which are produced by means of silicon technology and are integrated or inserted into flow channels. In EP 0 137 687 A1, the measurement is carried out in one or in a plurality of bypasses. In order to compensate for the temperature dependency of the characteristic curve, DE 43 24 040 A1 uses additional heater and media temperature sensors, the heater temperature being regulated to be constant with a changing mass flow and the media temperature being tracked via a characteristic curve which is dependent on material values. In U.S. Pat. No. 7,197,953 B2, Pt thin-film sensors for temperature measurement in combination with specific correlations for improving the accuracy of measurement are documented. WO 2007/063407 A2 describes the purposive distribution of the heat energy through heat-conducting material in order to reduce the systematic effects due to relatively low temperature differences. WO 01/14839 A1 describes a sensor whose heating element is operated in a pulsed manner. The mass flow is determined from the progression of the heating and cooling process at the sensor over time.

DE 689 03 678 T2 discloses a device for measuring the flow in liquids. A heating element is thereby arranged in a first block in order to increase the temperature thereof relative to a second block, a pipe being provided with a metal foil over its entire length. The metal foil and the pipe ensure that supplied heat energy flows from the first block to the second block, so that the whole region functions as a heat exchanger. This results in a temperature profile of the heat exchanger which is linear in the flow direction, the temperature of the heat exchanger increasing upstream in the flow direction.

U.S. Pat. No. 4,817,427 A discloses a device for measuring the flow of water in plant stems. Energy supplied via a main heater dissipates in the form of four different heat flows. In order to keep the sum of three of the four heat flows constant without having to determine their individual values exactly, additional heaters are used with varying water flows, regulation of which is effected via temperature gradients in the respective sections, which are detected by thermocouples. A homogenisation of the surface temperature of the main heater is achieved via copper foils.

In *Thermal mass-flow meter*, J. Phys. E 21, 1988, p. 994-997, J. H. Huij sing et al. describe a device for the thermal measurement of the mass flow rate, which device has three copper blocks which are arranged over the flow cross-section, the fluid flowing into the copper blocks through holes. The supply of a heat output takes place via the middle copper block. This arrangement ensures that the heat output is distributed evenly over the flow cross-section. The measurement principle is based on the temperature change of the fluid stream by the supplied heat output, the temperature profile of the heater in the flow direction playing no part.

SUMMARY

In an embodiment, the present invention provides a device for determining the mass flow of a fluid, the device including a line for conducting the fluid in a flow direction to a contact with a heat exchanger having a surface temperature which is constant in the flow direction, a first temperature measuring position upstream from the exchanger for determining a first fluid temperature, a second temperature measuring position downstream from the heat exchanger for determining a second fluid temperature, and a third temperature measuring position for detecting the surface temperature of the heat exchanger.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
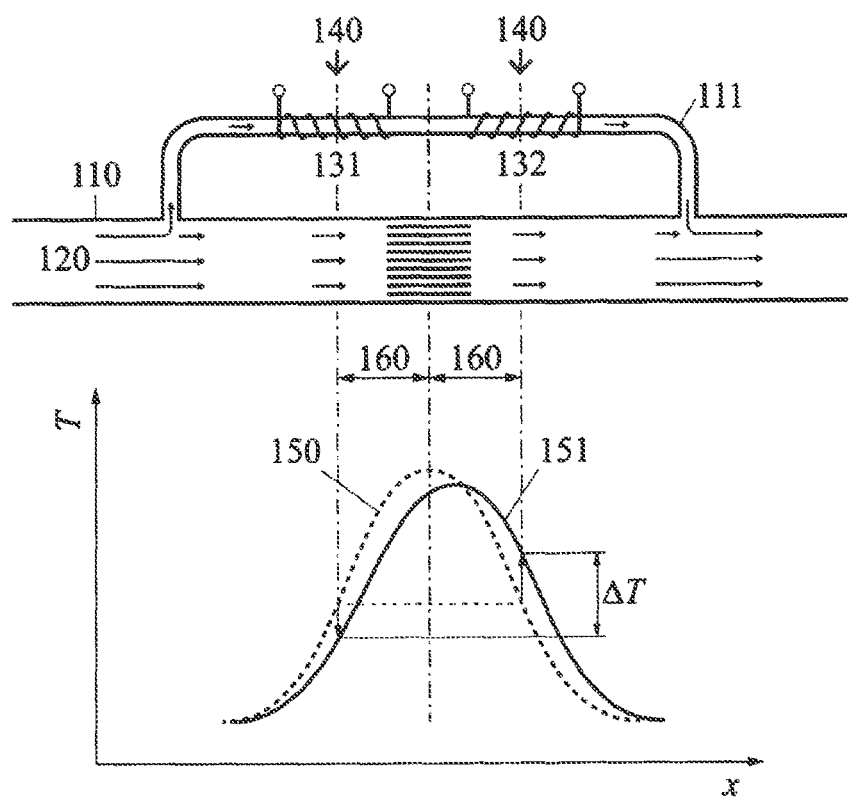
FIG. 1 shows the schematic structure and mode of operation of a thermal mass flow sensor according to the prior art.

Embodiments of the present invention overcome the mentioned disadvantages and limitations of the prior art. In particular, a device and a method for determining the mass flow of a fluid are to be provided which allow the mass flow or capacity flow of a fluid in a line to be determined as simply and at the same as accurately as possible.

The present invention differs from the measurement principle of known thermal mass flow sensors. In thermal mass flow sensors, sensor-specific characteristic curves are used to establish an empirical relationship between the measured temperature difference of the line and the mass flow that is to be determined. Different approaches are hereby used in an attempt to limit various error influences.

By contrast, a device according to the invention constitutes a type of sensor which is not known from the prior art, and an example method according to the invention uses analytical, that is to say physically exact, relationships to determine the mass flow—and optionally also the systematic errors of the measured quantities—by an intrinsic calibration. In this manner, systematic errors in the measured quantities obtained are corrected. If the systematic errors of the measured quantities are also determined exactly by a method according to the invention, the mass flow in the entire measuring range can be calculated from the energy balance of the flowing fluid. The actual size of the systematic errors, apart from numerical limitations, plays no part in their determination, that is to say complex methods for limiting error influences are not required.

In an embodiment, a device according to the invention has a line through which a fluid flows (see FIG. 2a). The fluid flowing in the line is conducted through a heated heat exchanger in such a manner that the heat exchanger surrounds the fluid or the line. In another embodiment, the heat exchanger is an electrically heatable copper block with high thermal conductivity, which is soldered to a stainless steel tube.

In an alternative embodiment, the line is arranged around the heat exchanger in such a manner that the fluid in the line flows around the heat exchanger (see FIG. 2b).

In a further embodiment, in which the heat exchanger is located inside the line, the fluid flows around the heat exchanger directly (see FIG. 2c).

The heat exchanger is in such a form that it has a surface temperature which is constant in the flow direction. The heat output supplied to the heat exchanger is preferably adjustable. Upstream and downstream of the heat exchanger are temperature measuring positions, with which the fluid temperatures are measured.

In an embodiment, the temperature measuring positions are arranged at arbitrary distances from the heat exchanger; in contrast to thermal mass flow sensors, a symmetrical arrangement around the heat exchanger is not necessary.

In a particular configuration, the temperature measuring positions, in the case where the heat exchanger is not accommodated inside the line, in contrast to thermal mass flow sensors, are attached to the line at distances from the heat exchanger which are sufficiently great that the fin efficiency of the line and/or the radial temperature profiles in the fluid are negligibly small. A negligible fin efficiency of the line means that the temperature increase through axial heat conduction in the line wall, starting from the heat exchanger as heat source, is negligibly small.

In a particular configuration, the first and the second temperature measuring positions are each preferably fixedly connected to a contact element, the first contact element surrounding the line upstream in relation to the heat exchanger and/or the second contact element surrounding the line downstream in relation to the heat exchanger.

In a particular configuration, the heat exchanger is surrounded by a saturated medium which is in the phase equilibrium of boiling liquid and saturated vapour, whereby the constant surface temperature in the flow direction is achieved via the saturation temperature of the medium condensing on the surface of the line and in the equilibrium state the condensed amount of liquid is vaporised again in the closed volume by the heat supplied by the heater. The constant surface temperature corresponding to the saturation temperature is thereby determined by measuring the vapour pressure. The temperature measuring positions for the fluid temperatures are likewise configured as vapour pressure thermometers which are filled with the same medium as the heat exchanger, so that the inlet temperature difference $\Delta T'$ and the outlet temperature difference $\Delta T''$ of the heat exchanger can each be determined by a differential pressure measurement (see FIG. 3).

Figure 4:
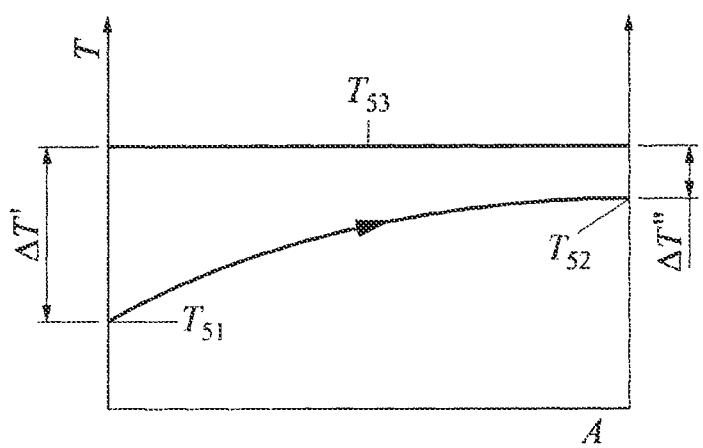
FIG. 4 shows the temperature/area diagram of a device according to the invention.

In order to understand an example method according to the invention, reference is made to the temperature/area diagram of the heat exchanger shown schematically in FIG. 4. $\Delta T'$ and $\Delta T''$ are determined by measuring the temperature difference between the constant surface temperature of the heat exchanger and the fluid temperatures both at a first temperature measuring position and at a second temperature measuring position, preferably using vapour pressure thermometers, resistance thermometers, thermocouples or thermopiles. Together with the adjustable heat output $\dot{Q}$, this gives the three measured quantities $\dot{Q}$, $\Delta T'$ and $\Delta T''$.

Two energy balances can be prepared from the three measured quantities $\dot{Q}$, $\Delta T'$ and $\Delta T''$, on the one hand the energy balance of the flowing fluid, on the other hand the energy balance of the heat exchanger. Two analytical functions for the mass flow can be derived from the two energy balances. Function A for the mass flow is preferably given by rearranging the energy balance of the flowing fluid. Function B for the mass flow is preferably obtained by equalising the two energy balances with application of the law of energy conservation and then solving for the mass flow.

The three measured quantities $\dot{Q}$, $\Delta T'$ and $\Delta T''$ are generally subject to their respective systematic errors $F_{\dot{Q}}$, $F_{\Delta T'}$ and $F_{\Delta T''}$. The results for the mass flow according to function A and according to function B therefore differ from one another without correction of the measured quantities, that is to say different systematic effects are obtained. However, the two analytical functions A and B are based solely on the same variables $\dot{Q}$, $\Delta T'$ and $\Delta T''$ and the specific heat capacity $c_p$ of the fluid. Therefore, the results of the functions A and B must correspond, on condition that the three variables of the functions are free of errors. Both the mass flow and the systematic errors of the measured quantities can be determined exactly from this condition by an intrinsic calibration of the sensor.

An example method according to the invention hence comprises method steps a) to c). According to step a), a series of measurements $\{\dot{Q}_i, \Delta T'_i, \Delta T''_i\}_{i=1 \ldots n}$ where $n \geq 2$ measurement points is recorded at a constant mass flow hi and constant temperature of the fluid at the first temperature measuring position, there being applied to the fluid at each measurement point by means of the heat exchanger a heat output $\dot{Q}$ which has been changed in relation to the preceding measurement points.

According to step b), the n data sets are transferred to the functions A and B and each expanded with the systematic errors $F_{\dot{Q}}$, $F_{\Delta T'}$ and $F_{\Delta T''}$, there being chosen as the first function A for the mass flow the function $$\dot{m}_A(\dot{Q}, \Delta T', \Delta T'') := \frac{\dot{Q}}{c_p(\dot{Q}, \Delta T', \Delta T'')},$$

and as the second function B for the mass flow the further function $$\dot{m}_B(\dot{Q}, \Delta T', \Delta T'') := \frac{1}{R(\dot{Q}, \Delta T', \Delta T'') c_p \ln \frac{\Delta T'}{\Delta T''}},$$

wherein R is the increase in the function $$\Delta T_m = \frac{\Delta T' - \Delta T''}{\ln \frac{\Delta T'}{\Delta T''}} = f(\dot{Q}),$$

which is determined by linear approximation of the measured data, and $$\ln \frac{\Delta T'}{\Delta T''}$$

denotes the natural logarithm of the quotient of $\Delta T'$ and $\Delta T''$. The functions A and B so formed are finally combined to give a common data quantity.

According to step c), the systematic errors are determined as free fit parameters of a fit function in which the variation, preferably the standard deviation, of the data quantity is minimised. The fit function provides the constant mass flow $\dot{m}$, the accuracy of which is dependent only on statistical uncertainties. However, arbitrary combinations of the three fit parameters $F_{\dot{Q}}$, $F_{\Delta T'}$ and $F_{\Delta T''}$ are obtained because the system of equations with two equations and three unknowns is underconstrained.

In a configuration, therefore, an example method according to the invention is expanded following step c) by the two further method steps d) and e). According to step d), the fit function is expanded by a third independent function C in order to determine exactly the values of the systematic errors $F_{\dot{Q}}$, $F_{\Delta T'}$ and $F_{\Delta T''}$.

According to step e), the mass flow is determined in standard operation of an example device according to the invention, that is to say in the entire measuring range using the measured quantities, in which the systematic errors have been corrected, from the energy balance of the flowing fluid according to function A.

The present invention can have the following advantages. An advantage of the present invention is the possibility of intrinsic calibration, that is to say calibration of an example device (sensor) according to the invention without a comparison standard. Carrying out the intrinsic calibration with at least 3 data points allows the steady-state conditions to be verified via the linearity of the equation $\Delta T_m = f(\dot{Q})$.

The exact determination of the mass flow or capacity flow is possible at any time under steady-state conditions using method steps a) to c). The measurement inaccuracy depends only on statistical uncertainties; they can be reduced with increasing measuring time.

The measurement inaccuracy of the mass flow or capacity flow can be given directly from the measurement itself. It corresponds in the intrinsic calibration to the residual standard deviation of the fit function. In standard operation, the measurement inaccuracy is calculated from function A with the statistical uncertainties of the measured quantities according to the law of error propagation.

A method according to the invention permits calibration at any time and at any place, in particular in the fitted state in a plant under real operating conditions. This can be advantageous in the case of special use conditions, in particular at very low or very high temperatures, at which the technical outlay for calibration at the factory would be too high, the recalibration of a sensor in the case of contamination, long operating times or after particular loads, especially after inadmissible stresses or excessively high temperatures in the event of a failure; and systems in which the device according to the invention is integrated together with other components, in particular in miniaturised systems.

A consistency or a change in the systematic errors can be diagnosed by the sensor itself by periodically comparing results from the standard operation according to method step e) and from the calibrating operation according to method steps a) to c). If necessary, the systematic errors can be determined again using method step d), in particular in the case of very variable ambient conditions.

In cases where the exact determination of the systematic errors according to method step d) is not carried out, characteristic curves and/or characteristic zones which are based on intrinsic calibrations according to method steps a) to c) with differently chosen operating conditions in each case are prepared during operation for an operating range of the device according to the invention.

By including a downstream regulating valve, the device according to the invention can be used as a mass flow regulator. The particular advantage of this configuration is that two series of measurements with a different mass flow through the mass flow regulator itself can be produced, in order to determine exactly the systematic errors according to method steps a) to d).

Unlike thermal mass flow sensors, it is not necessary to minimise the systematic errors of the measured quantities. As a result, the structure of the device according to the invention can be simplified considerably.

A device according to the invention allows the mass flow or capacity flow to be determined with substantially lower temperature differences in comparison with thermal mass flow sensors, preferably in the region of $(\Delta T'-\Delta T'')<1K$. As a result, measurement of the mass flow either in the bypass and/or directly in the main flow of the fluid is possible, without the flow to be determined being affected.

FIG. 1 shows a thermal mass flow sensor as is known from the prior art. In this configuration, the measurement takes place in a U-shaped bypass (111) of the line (110) through which the fluid (120) is flowing. In the 2-element principle shown, there are two elements (131, 132) which are arranged one after the other in the flow direction and which perform both the heating function and the function of temperature measurement. They are mounted on the heat-conducting bypass (111), are each heated with the electrical output (140) and are cooled by a part-stream of the flowing fluid (120). If both elements (131, 132) are heated with the same output (140), the bypass (111), with stationary fluid (120), has a symmetrical temperature profile (150) in relation to the positions (160) of the elements (131, 132), that is to say the temperature difference between the elements (131, 132) is theoretically zero. If, on the other hand, a part-stream of the fluid (120) is flowing through the bypass (111), the temperature profile (151) shifted in the flow direction x is formed. A temperature difference $\Delta T$ between the elements (131, 132) which is proportional to the mass flow is thereby measured.

Figure 2:
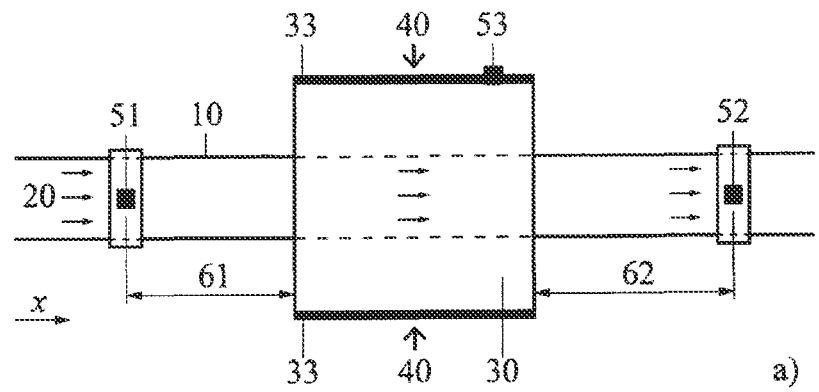
FIG. 2 shows the schematic structure of a device according to the invention in three advantageous embodiments a) to c)
Figure 2:
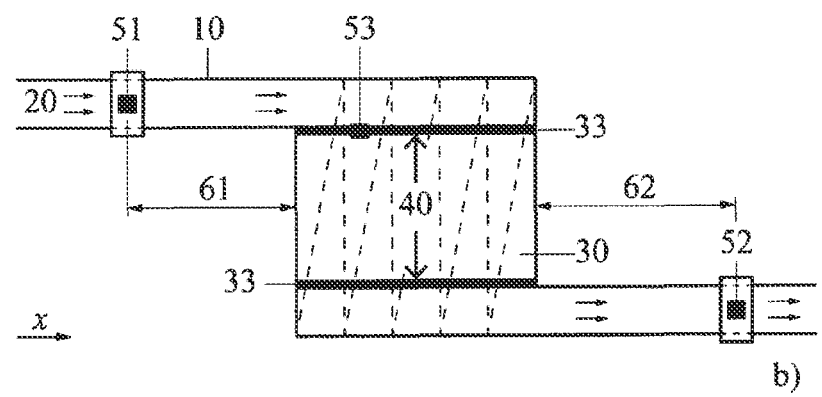
Figure 2:
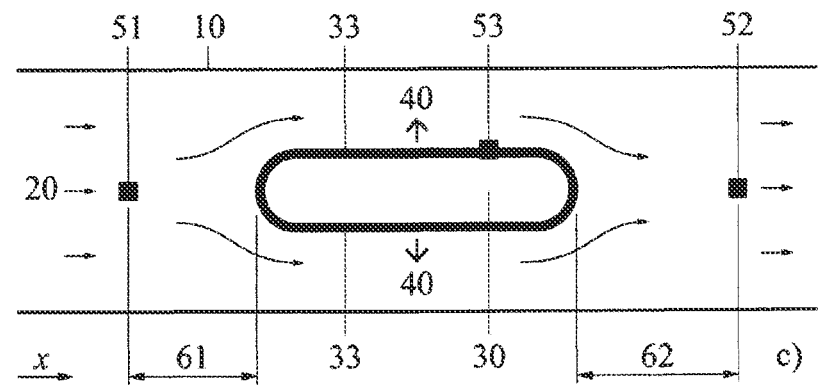

FIG. 2 shows schematically the structure of a device according to the invention in three different configurations.

The device according to FIG. 2a) has a line (10) through which a fluid (20) flows. The fluid (20) flowing in the line (10) is conducted through a heated heat exchanger (30) in such a manner that the heat exchanger (30) surrounds the fluid (20) and the line (10).

In a second configuration according to FIG. 2b), the line (10) is arranged around the heat exchanger (30) so that the fluid (20) in the line (10) flows around the heat exchanger (30).

FIG. 2c) shows a third configuration, in which the heat exchanger (30) is located inside the line (10) so that the fluid (20) flows around the heat exchanger (30) directly.

In all the configurations, the heat exchanger (30) is in such a form that it has a surface temperature (33) which is constant in the flow direction x. The heat output (40) supplied to the heat exchanger (30) is adjustable. The surface temperature (33) of the heat exchanger (30) is detected at a third temperature measuring position (53). Upstream and downstream of the heat exchanger (30) are the first temperature measuring position (51) and the second temperature measuring position (52), with which the associated fluid temperatures are determined. In the configurations according to FIG. 2a) and FIG. 2b), the first and second temperature measuring positions (51, 52), in contrast to thermal mass flow sensors, are arranged on the line (10) at distances (61, 62) from the heat exchanger (30) which are sufficiently great that the fin efficiency of the line (10) and the radial temperature gradients of the fluid (20) are negligibly small. In a configuration, the temperature measuring positions (51, 52) are arranged at otherwise arbitrary distances (61, 62) from the heat exchanger (30), that is to say, in contrast to thermal mass flow sensors, a symmetrical arrangement around the heat exchanger (30) is not necessary.

Figure 3:
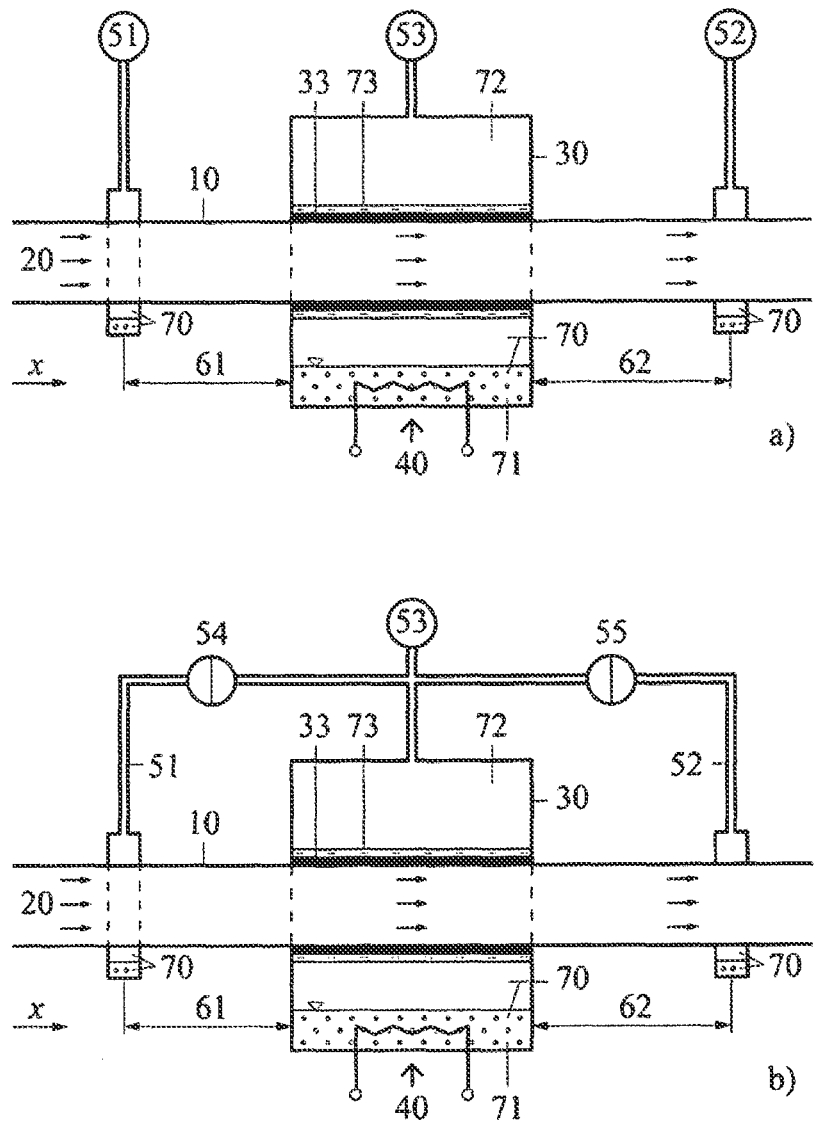
FIG. 3 shows the schematic structure of a device according to the invention in two further embodiments a) and b)

In the embodiment according to FIG. 3, the heat exchanger (30) has a closed volume which is filled with a saturated medium (70). The medium (70) is in the phase equilibrium of boiling liquid (71) and saturated vapour (72), as a result of which the constant surface temperature (33) in the flow direction is achieved via the saturation temperature of the medium (73) condensing on the surface of the line (10) and, in the equilibrium state, the condensed fluid is vaporised again in the closed volume by the heat (40) supplied by the heater. The constant surface temperature (33) corresponding to the saturation temperature is determined by measuring the vapour pressure (53). The temperature measuring positions (51) and (52) for the fluid temperatures are preferably likewise in the form of vapour pressure thermometers which are filled with the same medium (70) as the heat exchanger (30). According to FIG. 3a, the temperature differences $\Delta T'$ and $\Delta T''$ can be determined from the vapour pressure measurements (51) and (52) in relation to the vapour pressure measurement (53). In an alternative embodiment, the temperature differences $\Delta T'$ and $\Delta T''$ can each be determined according to FIG. 3b by a differential pressure measurement at two differential pressure measuring positions (54, 55), the pressure measurement (53) providing the relationship between the saturation pressure and the saturation temperature via the vapour pressure curve of the medium (70).

For all the configurations, including the embodiments shown in FIG. 2 and FIG. 3, the same method is used for determining a mass flow. FIG. 4 shows the associated temperature/area diagram of the heat exchanger (30). The inlet temperature difference $\Delta T'$ and the outlet temperature difference $\Delta T''$ of the heat exchanger (30) are determined by measuring the temperature difference between the constant surface temperature of the heat exchanger (30), which is detected at the third temperature measuring position (53), and the fluid temperatures at the two other temperature measuring positions (51, 52), preferably using vapour pressure thermometers, resistance thermometers, thermocouples or thermopiles. Together with the adjustable heat output $\dot{Q}$ (40), this gives three measured quantities $\dot{Q}$, $\Delta T'$ and $\Delta T''$.

Two energy balances can be prepared from the three measured quantities $\dot{Q}$, $\Delta T'$ and $\Delta T''$. The energy balance of the flowing fluid (20) was chosen as the first balance:

$$\dot{Q} = \dot{m} c_p (\Delta T' - \Delta T''). \quad (1)$$

wherein $\dot{Q}$ is the adjustable heat output (40), $\dot{m}$ is the mass flow of the fluid (20), $c_p$ is the specific heat capacity of the fluid (20), and $\Delta T'$ and $\Delta T''$ are the inlet and outlet temperature differences of the heat exchanger (30). The factor $\dot{m} c_p$ is also known as the capacity flow $\dot{C}$ of the fluid (20).

The energy balance of the heat exchanger (30) was chosen as the second balance:

$$\dot{Q} = kA\Delta T_m = \frac{1}{R}\Delta T_m = \frac{1}{R}\frac{\Delta T' - \Delta T''}{\ln\frac{\Delta T'}{\Delta T''}}. \quad (2)$$

wherein k is the heat transfer coefficient, based on the heat exchanger area A, and $\Delta T_m$ is the mean logarithmic temperature difference of the heat exchanger (30). The variables k and A can be combined to give the thermal resistance R of the heat exchanger (30). The expression for the mean logarithmic temperature difference $\Delta T_m$ is an analytical relationship, the derivation of which can be found in the specialist literature.

Figure 5:
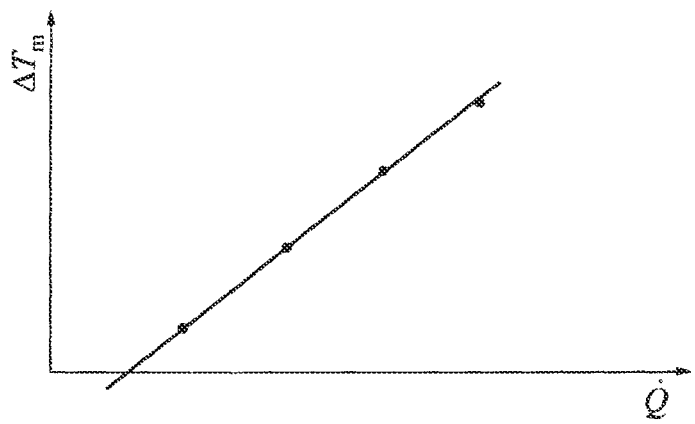
FIG. 5 shows the linear relationship between the measured quantities $\dot{Q}$ and $\Delta T_m = f(\Delta T'; \Delta T'')$.

The thermal resistance R is dependent on the internal thermal resistances of the heat exchanger (30) and on the heat transmission resistance to the fluid (20). The heat transmission resistance is constant in the case of a laminar flow but is influenced by the Reynolds number in the case of a turbulent flow of the mass flow to be measured. A calculation of R is generally omitted. Under steady-state conditions, however, R can easily be determined because at a constant mass flow $\dot{m}$, R is also a constant. If a series of measurements is carried out with a stepwise change of the heat output $\dot{Q}$, a linear relationship between the measured quantities $\dot{Q}$ and $\Delta T_m = f(\Delta T'; \Delta T'')$ is obtained according to equation (2), wherein R is the increase in the function, which can be determined by linear approximation of the measured data (see FIG. 5):

$$R = f(\dot{Q}, \Delta T', \Delta T''). \quad (3)$$

Two analytical functions for the mass flow can be derived from the two energy balances. The function A chosen here for the mass flow is given by rearranging equation (1):

$$\dot{m}_A(\dot{Q}, \Delta T', \Delta T'') := \frac{\dot{Q}}{c_p(\dot{Q}, \Delta T', \Delta T'')}. \quad (4)$$

The function B chosen here for the mass flow is obtained by equalising equations (1) and (2), with application of the law of energy conservation, and then solving for the mass flow:

$$\dot{m}_B(\dot{Q}, \Delta T', \Delta T'') := \frac{1}{R(\dot{Q}, \Delta T', \Delta T'') c_p \ln\frac{\Delta T'}{\Delta T''}}. \quad (5)$$

If the specific heat capacity $c_p$ of the fluid (20) is not known, the functions A and B can be prepared analogously for the capacity streams $\dot{C}_A$ and $\dot{C}_B$.

Figure 6:
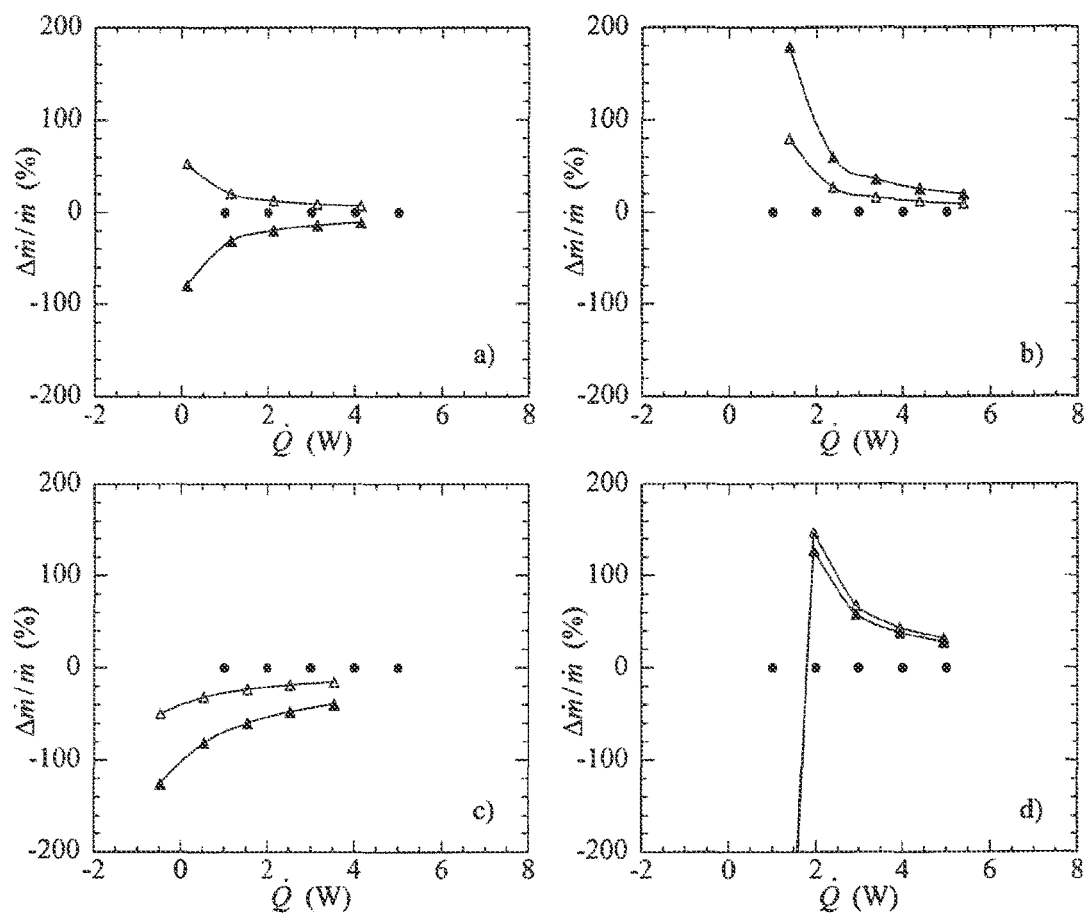
FIG. 6 shows systematic effects of functions A and B.

The three measured quantities $\dot{Q}$, $\Delta T'$ and $\Delta T''$ are generally subject to systematic errors $F_{\dot{Q}}$, $F_{\Delta T'}$ and $F_{\Delta T''}$. The results for the mass flow according to function A and according to function B therefore differ from one another without correction of the measured quantities, that is to say different systematic effects are obtained. Such systematic effects of functions A and B are shown by way of example in FIG. 6. In that figure, the relative errors of the calculated mass flows in relation to error-free exemplary data are plotted over the heat output $\dot{Q}$. The data given in FIG. 6 are summarised in Tab. 1. With regard to their signs, the systematic effects can have a tendency in opposite directions (see FIG. 6a) or tendencies in the same directions, as in FIG. 6b or in FIG. 6c. Discontinuities of the systematic effects with a change of sign are also possible (see FIG. 6d). The relative errors of the calculated mass flows are so great that a direct evaluation of the measured quantities is generally ruled out.

TABLE 1

• Error-free exemplary data:
  $\dot{m} = 0.001$ kg/s, $\dot{Q} = \{1, 2, 3, 4, 5\}$ W, $T_{51} = 300$ K, $c_p = 4200$ J/(kg K), R = 0.3 K/W
  ▲ Mass flow $\dot{m}_A$ according to function A with systematic errors
  △ Mass flow $\dot{m}_B$ according to function B with systematic errors

| Systematic errors: | a) | b) | c) | d) |
|---|---|---|---|---|
| $F_{\dot{Q}}$ (W) | 0.868 | −0.387 | 1.446 | 0.061 |
| $F_{\Delta T'}$ (K) | 0.061 | 0.103 | −0.113 | 0.123 |
| $F_{\Delta T''}$ (K) | −0.026 | −0.017 | 0.082 | −0.150 |

The two analytical functions A and B are based solely on the same variables $\dot{Q}$, $\Delta T'$ and $\Delta T''$ and the specific heat capacity $c_p$ of the fluid. Therefore, the results of functions A and B must agree on condition that the three variables of the functions are free of errors. Corresponding error-free variables can be formed by subtracting the systematic errors $F_{\dot{Q}}$, $F_{\Delta T'}$ and $F_{\Delta T''}$ from the measured quantities $\dot{Q}$, $\Delta T'$ and $\Delta T''$ (The influence of statistical uncertainties will be discussed later in an example). The parameter $F_{\dot{Q}}$ thereby contains not only the actual systematic measuring errors of the heat output $\dot{Q}$, but also the part of the heat output which flows away to the surroundings or is additionally taken up therefrom. With equations (4) and (5), the following physically exact relationship applies:

$$\dot{m}_A(\dot{Q} - F_{\dot{Q}}, \Delta T' - F_{\Delta T'}, \Delta T'' - F_{\Delta T''}) \stackrel{def}{=} \quad (6)$$
$$\dot{m}_B(\dot{Q} - F_{\dot{Q}}, \Delta T' - F_{\Delta T'}, \Delta T'' - F_{\Delta T''}).$$

On the basis of equation (6), the determination of the mass flows or capacity flows is carried out via an intrinsic calibration of the device according to the invention by the following method steps:

A series of measurements is carried out under steady-state conditions, that is to say with a constant mass flow $\dot{m}$ and constant fluid temperature (51), in which the heat output $\dot{Q}$ (40) is preferably changed stepwise. From the series of measurements with n measurement points there are obtained i=1 n data sets $\{\dot{Q}_i, \Delta T'_i, \Delta T''_i\}$. For the linear approximation of the thermal resistance $$R = f(\dot{Q}, \Delta T' - F_{\Delta T''}\Delta T'' - F_{\Delta T''}),$$

n≥2 measuring points are required. More than 2 measuring points are advantageous because the residues of the linear approximation allow conclusions to be drawn regarding the actual stability of the operating conditions during the calibration.

The n data sets are transferred to the functions A and B for the mass flow and expanded analogously to equation (6) with the systematic errors $F_{\dot{Q}}$, $F_{\Delta T'}$ and $F_{\Delta T''}$. The functions A and B so formed are combined to give a common data quantity.

The systematic errors $F_{\dot{Q}}$, $F_{\Delta T'}$ and $F_{\Delta T''}$ are then determined as free fit parameters of a fit function, in which the variation, preferably the standard deviation of the data quantity is minimised. With the fitting so carried out, the constant mass flow or capacity flow of the intrinsic calibration is obtained. The result for the capacity flow $\dot{C} = \dot{m} c_p$ depends only on statistical uncertainties, that is to say on variations in the capacity flow itself and on variations of the measured quantities about their mean values. The residual standard deviation of the 2 n data points of the data quantity is a direct measure of the measurement uncertainty of the capacity flow measurement. The measurement uncertainty of the mass flow $\dot{m}$ is additionally dependent on the uncertainty of the value of the specific heat capacity $c_p$.

As the result of the fit function, in principle arbitrary combinations of the fit parameters $F_{\dot{Q}}$, $F_{\Delta T'}$ and $F_{\Delta T''}$ are possible. This is because the equation system with two equations and three unknowns is underconstrained. Although the exact capacity flow or mass flow is obtained for the fitted series of measurements, the use of such arbitrary combinations of fit parameters in the whole measurement range of a device according to the invention would result in systematic effects as in FIG. 6. This situation can be utilised by using a second series of measurements with a different mass flow and executing the fit function with the data of both series of measurements. The second series of measurements can be taken into account by various mathematical methods. Preferably, the expansion of the fit function by a boundary condition in relation to the second series of measurements is possible, or the standard deviations of both series of measurements can be minimised at the same time. The systematic errors $F_{\dot{Q}}$, $F_{\Delta T'}$ and $F_{\Delta T''}$ are thereby the same in both series of measurements and at all measurement points. The second series of measurements thus yields in an experimental manner a third independent function C of the fit function, as a result of which the systematic errors $F_{\dot{Q}}$, $F_{\Delta T'}$ and $F_{\Delta T''}$ can be determined exactly.

The standard operation of a device according to the invention requires intrinsic calibration with three independent relationships for the exact determination of the systematic errors. The mass flow is calculated with the measured quantities, in which the systematic errors have been corrected, from the energy balance of the flowing fluid according to function A. The measurement uncertainty depends, in addition to the statistical uncertainties, on the extent to which the systematic errors in the measuring range of the sensor are unchanged.

A fit function expanded by a second series of measurements provides the accuracies summarised in Tab. 2 of the systematic errors $F_{\dot{Q}}$, $F_{\Delta T'}$ and $F_{\Delta T''}$ for the exemplary data listed in Tab. 1. If these data are used as residual errors, in order to calculate the uncertainty of the mass flow according to equation (4) and the law of error propagation, then values of $<10^{-7}$ kg/s are obtained for all the exemplary data. This result leads to the following conclusions:

In comparison with thermal mass flow sensors, devices according to the invention can be operated with substantially smaller temperature differences, whereby temperature differences of the fluid of $(\Delta T' - \Delta T'') < 1$ K are possible. As a result, in addition to a mass flow measurement in the bypass, mass flow measurement directly in the main flow of the fluid is in particular also possible.

The measurement uncertainty of devices according to the invention is dependent almost exclusively on the stability of the operating parameters during the intrinsic calibration, as well as on the stability and the resolution of the three measured quantities. The accuracy of the three measured quantities plays no part.

TABLE 2

Accuracies of the systematic errors for a fit function expanded with a second series of measurements using the exemplary data from Tab. 1: $\dot{m} = 0.001$ kg/s, $\dot{Q} = \{1, 2\}$ W, $T_{S1} = 300$ K, $c_p = 4200$ J/(kg K), $R = 0.27$ K/W

|  | a) | b) | c) | d) |
|---|---|---|---|---|
| $F_{\dot{Q},fit} - F_{\dot{Q}}$ (W) | $2.8 \times 10^{-8}$ | $7.1 \times 10^{-6}$ | $1.2 \times 10^{-6}$ | $-1.8 \times 10^{-6}$ |
| $F_{\Delta T',fit} - F_{\Delta T'}$ (K) | $-7.5 \times 10^{-9}$ | $3.1 \times 10^{-6}$ | $3.8 \times 10^{-7}$ | $-6.6 \times 10^{-7}$ |
| $F_{\Delta T'',fit} - F_{\Delta T''}$ (K) | $-1.1 \times 10^{-8}$ | $1.4 \times 10^{-6}$ | $2.2 \times 10^{-7}$ | $-4.2 \times 10^{-7}$ |

In a method according to the invention it was assumed that the heat transfer coefficient k and accordingly the thermal resistance R at a constant mass flow $\dot{m}$ are likewise constant. This assumption in principle applies only to gas flows, while in the case of liquid flows the influence of the wall temperature is to be taken into consideration via the viscosity ratio. However, this influence is only in the region of $10^{-3} K^{-1}$; it is negligible within a series of measurements taking into consideration the necessary temperature changes.

The use of the calibrated systematic errors in the standard operation of a device according to the invention requires that the systematic errors do not change at different mass flows. This can only be achieved if temperature differences as a result of intrinsic heating of the temperature sensors are negligible at the first temperature measuring position (51) and at the second temperature measuring position (52). The use of vapour pressure thermometers, thermocouples or thermopiles for measuring the inlet and outlet temperature differences $\Delta T'$ and $\Delta T''$ is therefore particularly advantageous, because the functioning of such devices means that no intrinsic heating occurs. While a resolution of the temperature measurement in the millikelvin range can be achieved with vapour pressure thermometers, the resolution of thermocouples or thermopiles is, however, limited. As an alternative thereto, the use of thermometers with intrinsic heating, in particular of resistance thermometers, is not ruled out. However, the operating parameters thereof and the size of the contact surfaces (11, 12) at the two temperature measuring positions (51, 52) must be matched to one another in such a manner that the influence of the intrinsic heating is negligible.

Figure 7:
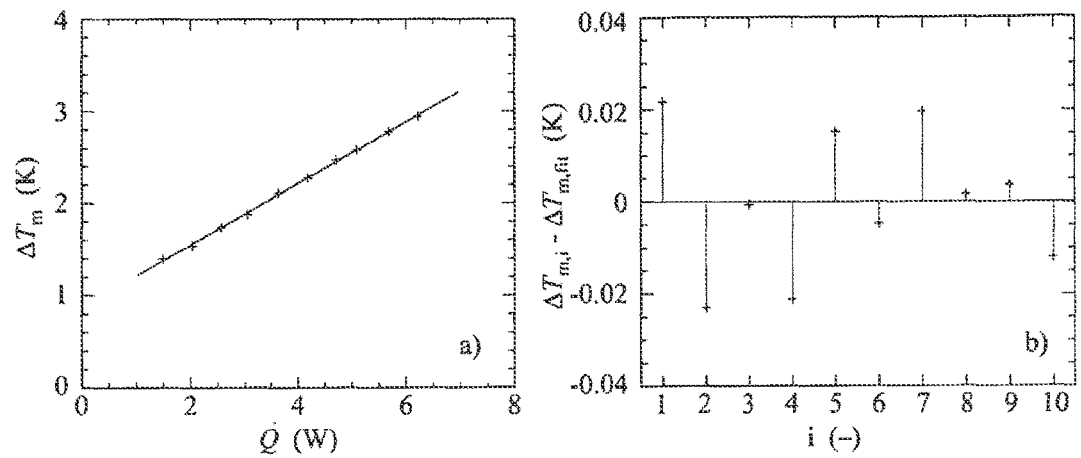
FIG. 7 shows measurement results of a device according to the invention with error bars.
Figure 8:
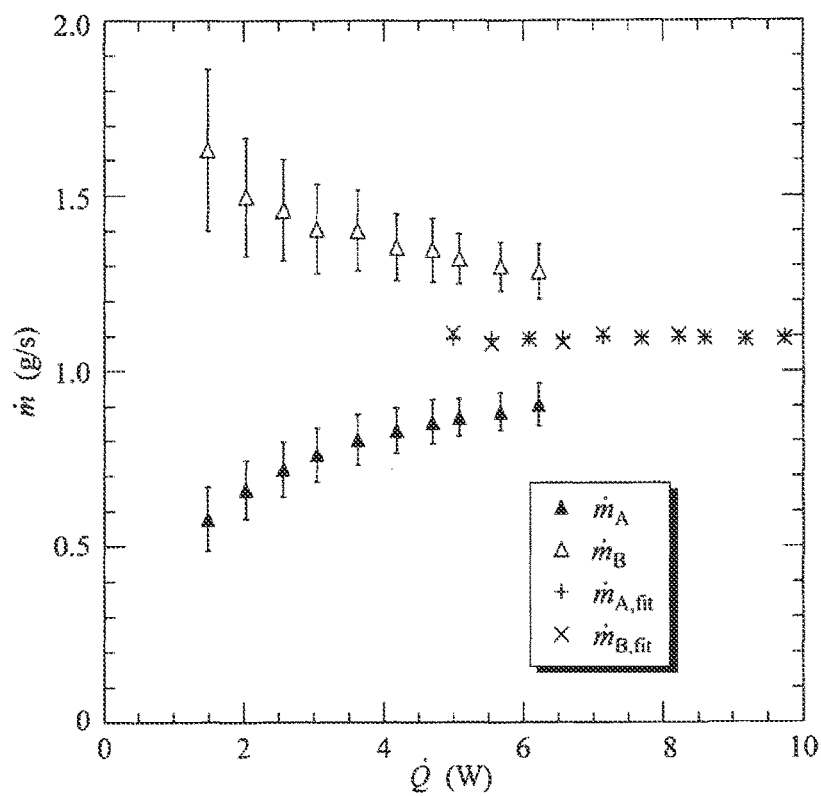
FIG. 8 shows values for the mass flow determined therefrom.

FIG. 7 and FIG. 8 show measurement results of a device according to the invention in an embodiment according to FIG. 2b). The constant surface temperature (33) of the heat exchanger (30) was here achieved by condensing neon. In addition to a static component, the variable heat output $\dot{Q}$

(40) was fed electrically to the neon. The heat dissipation was effected by gaseous helium in the line (10) whose mass flow ṁ was determined. The temperatures of the helium at the two temperature measuring positions (51, 52) were measured by TVO sensors on the line (10). The expression TVO sensor denotes a type of resistance thermometer which is preferably used at low temperatures. The thermal contact surfaces between the TVO sensors and the line (10) were sufficiently great that the effect of the intrinsic heating was negligible. The temperature of the saturated neon at the third temperature measuring position (53) was determined via the vapour pressure curve from the measured saturation pressure of the neon.

Under steady-state conditions, 10 measurement points were recorded at variable heat output Q̇. At each of the 10 measurement points, approximately 1000 measurement data were recorded over a period of 30 minutes, from which measurement data the mean values and the standard deviations of the measured quantities were calculated. FIG. 7a) shows the linearity of the measured data in the form $\Delta T_m = f(\dot{Q})$ for determining the thermal resistance R. FIG. 7b) shows the residues of the 10 measurement points in relation to the regression line.

The systematic effects of the functions A and B using the mean values of the measured quantities are given in FIG. 8 as $\dot{m}_A$ and $\dot{m}_B$. The error bars characterise the statistical components of the combined standard uncertainties, resulting from a type-A evaluation according to ISO/ICE Guide 98-3:2008. Based on the calculated mass flows, the statistical components of the combined standard uncertainties were in a range of $$u_{\dot{m}} = 6 \ldots 16\%.$$

The results of the calculated mass flows using method steps a) to c) are characterised in FIG. 8 with $\dot{m}_{A,fit}$ and $\dot{m}_{B,fit}$. If the measurements were free of statistical uncertainties, then each measurement point $\dot{m}_{A,fit}$ (+), after correction of the systematic errors according to equation (6), would correspond exactly to the associated measurement point $\dot{m}_{B,fit}$ (x). In addition, all the measurement points would lie exactly on a horizontal line. The deviations from this theoretical correspondence are accordingly a direct measure of the other error components, that is to say of the statistical uncertainties of the measurement. This means that the standard uncertainty of the mass flow determined by the fit function is equal to the residual standard deviation of the data quantity. A mean mass flow of $\dot{m}_{fit} = 1.095 \pm 0.0065$ g/s was calculated from the measured data. This result corresponds to a relative standard uncertainty of the mass flow measurement of $$u_{\dot{m},fit} = 0.6\%$$

By means or a method according to the invention, therefore, not only were the systematic errors of the mass flow measurement corrected, but the statistical uncertainty was also reduced by more than one order of magnitude. The low measurement uncertainty of 0.6% could already be achieved with standard process measurement technology for the temperature, pressure and output measurement, which was not specially optimised for the requirements of a device according to the invention.

A method according to the invention, which is based on two independent analytical relationships and an independent experimental relationship for determining the systematic errors of three measured quantities, can in principle be expanded by additional measured quantities $Y_i$ and associated error parameters $F_{Y_i}$. In order to determine the error parameters $F_{Y_i}$, i additional independent relationships are then required, which can again be provided experimentally.

Figure 9:
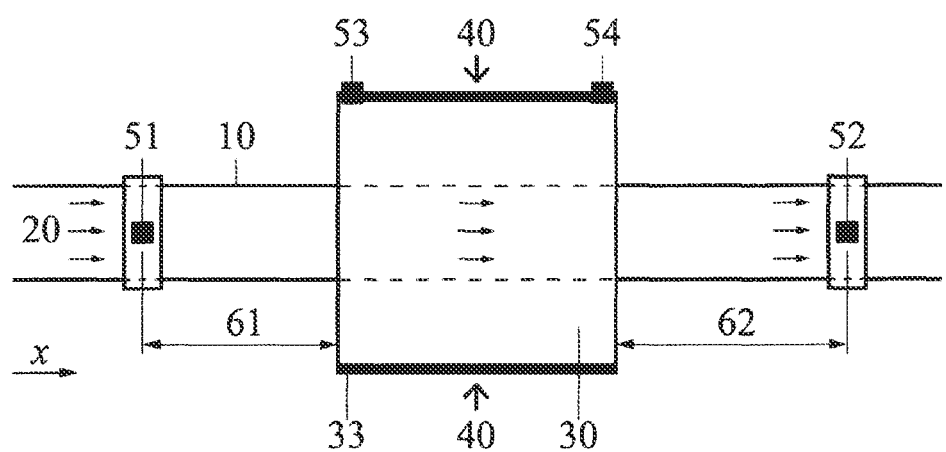
FIG. 9 shows the schematic structure of a further embodiment.

In a first embodiment for the model expansion, an additional temperature measuring position (54) for the surface temperature of the heat exchanger (30) is provided according to FIG. 9. In this configuration, the inlet temperature difference ΔT' and the outlet temperature difference ΔT" are measured separately. For the determination of the error parameters, a third series of measurements at a mass flow different from the first and second series of measurements is then required.

In a second embodiment for the model expansion, an additional temperature measuring position is provided on the housing of a device according to the invention, in order to take into consideration the influence of the ambient temperature and accordingly a possible change in the error parameter $F_{\dot{Q}}$. In this case, an additional series of measurements at variable housing temperature is required for determining the systematic errors.

Fluids are understood as being gaseous media, liquid media and mixtures of gaseous, liquid and/or solid components without latent heat. Lines within the meaning of the invention are pipes and channels of any desired closed cross-sectional geometry. If the specific heat capacity $c_p$ of the fluid is not known, then the invention allows the capacity flow $\dot{C} = \dot{m} \, c_p$ of the fluid to be determined.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device for determining the mass flow of a fluid, the device comprising:
   a line for conducting the fluid in a flow direction to a contact with a heat exchanger, the heat exchanger having a surface temperature which is constant in the flow direction;

a first temperature measuring position upstream from the exchanger for determining a first fluid temperature;

a second temperature measuring position downstream from the heat exchanger for determining a second fluid temperature; and a third temperature measuring position for detecting the surface temperature of the heat exchanger.

2. The device according to claim 1, further comprising: an adjustable device for supplying a heat output to the heat exchanger.

3. The device according to claim 1, wherein the heat exchanger and the line are disposed such that:
the heat exchanger surrounds the line;
the line surrounds the heat exchanger; or
the heat exchanger is accommodated inside the line.

4. The device according to claim 3, wherein if the heat exchanger is not accommodated inside the line, the first temperature measuring position is arranged at a first distance from the heat exchanger and the second temperature measuring position is arranged at second a distance from the heat exchanger, wherein the first and second distances are distances at which at least one of a fin efficiency of the line is negligibly small and radial temperature profiles of the fluid are negligibly small.

5. The device according to claim 4, wherein the first distance is not equal to the second distance.

6. The device according to claim 1, further comprising at least one of:
a first contact element connected to the first temperature measuring position that surrounds the line at a location upstream of the heat exchanger; or
a second contact element connected to the second measuring position that surrounds the line at a location downstream of the heat exchanger.

7. The device according to claim 1, further comprising:
a fourth temperature measuring position provided on the surface of the heat exchanger, the fourth temperature measuring position being different from the third temperature measuring position.

8. The device according to claim 1, further comprising one or more of:
a first temperature difference measurement detector configured to detect a temperature difference ΔT' between the third temperature measuring position and the first temperature measuring position, and
a second temperature difference measurement detector configured to detect a temperature difference ΔT" between the third temperature measuring position and the second temperature measuring position
wherein each of the first and second temperature difference measurement devices is one of a thermocouple, a thermopile, or a set of resistance thermometers.

9. The device according to claim 1, further comprising a heater;
wherein the heat exchanger has a closed volume filled with a saturated medium in the phase equilibrium of boiling liquid and saturated vapour,
wherein the constant surface temperature in the flow direction is achieved via the saturation temperature of the saturated medium condensing on the surface of the line, and
wherein in the equilibrium state heat supplied by the heater re-vaporizes the saturated medium condensed on the line.

10. The device according to claim 9, wherein at least one of:

the third temperature measuring position measures the constant surface temperature via a vapour pressure curve and a vapour pressure of the saturated medium in the heat exchanger (30), and/or the first temperature measuring position (51), and a vapour pressure thermometer at the first temperature measuring position and a vapour pressure thermometer at the second temperature measuring position are filled with the same medium as the heat exchanger so that the temperature difference ΔT' between the third temperature measuring position and the first temperature measuring position and the temperature difference ΔT" between the third temperature measuring position and the second temperature measuring position can be detected from a pressure measurement or from a differential pressure measurement.

11. The device according to claim 1, wherein the line carries one of a main flow of the fluid or a bypass that is a portion of the main flow of the fluid.

12. The device according to claim 1, further comprising a first temperature measuring device configured to directly measure the fluid temperature at the first temperature measuring position; and
a second temperature measuring device configured to directly measure the fluid temperature at the second temperature measuring position.

13. A method for determining a mass flow of a fluid, the method comprising:
recording, at a first constant mass flow and a first constant temperature at a first measuring position, a series of measurements $\{\dot{Q}_i, \Delta T'_i, \Delta T''_i\}_{i=1 \ldots n}$, $n \geq 2$, for n temperature measuring positions, wherein $\dot{Q}$ is a heat output applied to the fluid at a measuring position by a heat exchanger, the heat output $\dot{Q}$ applied to the fluid at a measuring position is different than that applied to the fluid at a preceding measuring position, $\Delta T'$ is a temperature difference between a third temperature measuring position and a first temperature measuring position, $\Delta T''$ is a temperature difference between the third temperature measuring position and a second temperature measuring position, the first temperature measuring position is arranged upstream in relation to the heat exchanger, the second temperature measuring position is arranged downstream in relation to the heat exchanger, and the heat exchanger has a surface temperature which is constant in the flow direction and which can be detected at the third temperature measuring position, expanding the quantities $\dot{Q}$, $\Delta T'$ and $\Delta T''$ of the recorded series of measurements $\{\dot{Q}_i, \Delta T'_i, \Delta T''_i\}_{i=1 \ldots n}$ with respective systematic errors $F_{\dot{Q}}$, $F_{\Delta T'}$ and $F_{\Delta T''}$;

inserting the expanded series of measurements both into a first function and into a second function, wherein the first and second functions link the quantities $\dot{Q}$, $\Delta T'$ and $\Delta T''$ and a specific heat capacity $c_p$ of the fluid, the first function is $$\dot{m}_A(\dot{Q}, \Delta T', \Delta T'') := \frac{\dot{Q}}{c_p(\dot{Q}, \Delta T', \Delta T'')},$$

the second function is $$\dot{m}_B(\dot{Q}, \Delta T', \Delta T'') := \frac{1}{R(\dot{Q}, \Delta T', \Delta T'')c_p \ln\frac{\Delta T'}{\Delta T''}},$$

R is the increase in the function $$\Delta T_m = \frac{\Delta T' - \Delta T''}{\ln\frac{\Delta T'}{\Delta T''}} = f(\dot{Q}),$$

which is determined by linear approximation of the measured data, $$\ln\frac{\Delta T'}{\Delta T''}$$

denotes the natural logarithm of the quotient of $\Delta T'$ and $\Delta T''$, and combining the results of the first mass flow function and the results of the second mass flow function to give a common data quantity; and varying the systematic errors $F_{\dot{Q}}$, $F_{\Delta T'}$ and $F_{\Delta T''}$ as free fit parameters by application of a fit function in which the variation of the common data quantity is minimised, whereby the fit function provides a value for the constant mass flow $\dot{m}$.

14. The method of claim 13, further comprising:
expanding the fit function with a third function which represents a relationship that is independent of both the first function and the second function, and determining the exact values for the systematic errors $F_{\dot{Q}}$, $F_{\Delta T'}$ and $F_{\Delta T''}$;
determining the value for the mass flow directly from the measured quantities $\dot{Q}$, $\Delta T'$ and $\Delta T''$, in each case subtracting the determined systematic errors $F_{\dot{Q}}$, $F_{\Delta T'}$ and $F_{\Delta T''}$ and applying the first function.

15. The method of claim 13, wherein a second series of measurements with a second constant mass flow different from the first constant mass flow is used for the third function and is inserted into at least one of the first function or the second function.

16. A method for preparing at least one of characteristic curves or characteristic zones:
choosing a plurality of operating conditions; and
preparing, for each of the a plurality of operating conditions, at least one of a characteristic curve or a characteristic zone;
wherein preparing at least one of a characteristic curve or a characteristic zone is based on an intrinsic calibration under the corresponding operating condition, the intrinsic calibration performed by:
recording, at a first constant mass flow and a first constant temperature at a first measuring position, a series of measurements $\{\dot{Q}_i, \Delta T'_i, \Delta T''_i\}$ i=1 ... n, n≥2, for n temperature measuring positions, wherein $\dot{Q}$ is a heat output applied to the fluid at a measuring position by a heat exchanger, the heat output $\dot{Q}$ applied to the fluid at a measuring position is different than that applied to the fluid at a preceding measuring position, $\Delta T'$ is a temperature difference between a third temperature measuring position and a first temperature measuring position, $\Delta T''$ is a temperature difference between the third temperature measuring position and a second temperature measuring position, the first temperature measuring position is arranged upstream in relation to the heat exchanger, the second temperature measuring position is arranged downstream in relation to the heat exchanger, and the heat exchanger has a surface temperature which is constant in the flow direction and which can be detected at the third temperature measuring position, expanding the quantities $\dot{Q}$, $\Delta T'$ and $\Delta T''$ of the recorded series of measurements $(\dot{Q}_i, \Delta T'_i, \Delta T''_i)$ i=1 ... n with respective systematic errors $F_{\dot{Q}}$, $F_{\Delta T'}$ and $F_{\Delta T''}$;

inserting the expanded series of measurements both into a first function and into a second function, wherein the first and second functions link the quantities $\dot{Q}$, $\Delta T'$ and $\Delta T''$ and a specific heat capacity $c_p$ of the fluid, the first function is $$\dot{m}_A(\dot{Q}, \Delta T', \Delta T'') := \frac{\dot{Q}}{c_p(\dot{Q}, \Delta T', \Delta T'')},$$

the second function is $$\dot{m}_B(\dot{Q}, \Delta T', \Delta T'') := \frac{1}{R(\dot{Q}, \Delta T', \Delta T'')c_p \ln\frac{\Delta T'}{\Delta T''}},$$

R is the increase in the function $$\Delta T_m = \frac{\Delta T' - \Delta T''}{\ln\frac{\Delta T'}{\Delta T''}} = f(\dot{Q}),$$

which is determined by linear approximation of the measured data, $$\ln\frac{\Delta T'}{\Delta T''}$$

denotes the natural logarithm of the quotient of $\Delta T'$ and $\Delta T''$, and combining the results of the first mass flow function and the results of the second mass flow function to give a common data quantity; and varying the systematic errors $F_{\dot{Q}}$, $F_{\Delta T'}$ and $F_{\Delta T''}$ as free fit parameters by application of a fit function in which the variation of the common data quantity is minimised, whereby the fit function provides a value for the constant mass flow $\dot{m}$, and wherein the characteristic curves and characteristic zones correspond to a range of operation of a device for determining the mass flow of a fluid, the device comprising:
a line for conducting the fluid in a flow direction to a contact with the heat exchanger, the heat exchanger having a surface temperature which is constant in the flow direction;
the first temperature measuring position upstream from the exchanger for determining a first fluid temperature;
the second temperature measuring position downstream from the heat exchanger for determining a second fluid temperature; and
the third temperature measuring position for detecting the surface temperature of the heat exchanger.

* * * * *